(12) United States Patent
Rossini et al.

(10) Patent No.: US 6,670,442 B1
(45) Date of Patent: Dec. 30, 2003

(54) HOT MELT ADHESIVES BASED ON POLYAMIDES

(75) Inventors: Angela Rossini, Milan (IT); Francesco Meda, Lu(Al) (IT)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/868,808

(22) PCT Filed: Dec. 11, 1999

(86) PCT No.: PCT/EP99/09839

§ 371 (c)(1),
(2), (4) Date: Jun. 21, 2001

(87) PCT Pub. No.: WO00/37538

PCT Pub. Date: Jun. 29, 2000

(30) Foreign Application Priority Data

Dec. 21, 1998 (EP) .............................. 98124176

(51) Int. Cl.$^7$ .......................... C08G 69/34; B32B 31/00
(52) U.S. Cl. ....................... 528/310; 528/338; 528/339; 528/339.3; 528/340; 528/341; 528/349; 526/317.1; 526/318.2; 526/935; 156/60; 156/325; 156/326; 156/330.9
(58) Field of Search ............................. 528/339.3, 339, 528/338, 340, 341, 349; 156/330.9, 60, 325, 326; 526/935, 317.1, 318.2

(56) References Cited

U.S. PATENT DOCUMENTS

| 4,396,759 A | | 8/1983 | Drawert et al. ........... 528/339.3 |
| 4,652,327 A | | 3/1987 | Hayes et al. ............ 156/244.22 |
| 4,791,164 A | | 12/1988 | Wichelhaus et al. ........ 524/514 |
| 4,853,460 A | * | 8/1989 | Harman .................... 528/339.3 |
| 4,882,414 A | * | 11/1989 | Wroczynski .............. 528/339.3 |
| 4,912,196 A | | 3/1990 | Leoni et al. .............. 528/339.3 |
| 5,548,027 A | | 8/1996 | Heucher et al. ............ 525/179 |
| 6,573,319 B1 | * | 6/2003 | Birnbrich et al. ........... 524/224 |

FOREIGN PATENT DOCUMENTS

| EP | 0 045 383 | 2/1983 |
| EP | 0 182 957 | 6/1986 |
| EP | 0 334 667 | 9/1989 |

OTHER PUBLICATIONS

Gerd Habenicht, Kleben, Grundlagen, Technologie, Anwendungen, 3$^{rd}$ Edition, (1997), pp. 613–614.

* cited by examiner

*Primary Examiner*—P. Hampton-Hightower
(74) *Attorney, Agent, or Firm*—Stephen D. Harper; Daniel S. Ortiz

(57) ABSTRACT

Hot melt adhesives are prepared using thermoplastic polyamides derived from polymerized fatty acid components. The adhesives are particularly useful for bonding nonpolar substrates such as poly-α-olefins.

23 Claims, No Drawings

HOT MELT ADHESIVES BASED ON POLYAMIDES

CROSS REFERENCE TO RELATED APPLICATIONS

The application is a national stage application under 35 U.S.C. §371 of International Application PCT/EP99/09839 filed Dec. 11, 1999. This application also claims priority under 35 U.S.C. §119 to EP98124176.3 filed Dec. 21, 1998. The International Application was published in English.

FIELD OF THE INVENTION

Background of the Invention

The present invention relates to polyamide compositions which are useful as hotmelt adhesives, in particular the invention relates to polyamide compositions which are suitable for bonding nonpolar substrates such as poly-α-olefin substrates. More specifically, the compositions of the present invention are thermoplastic polyamides derived from the polymerized fatty acid components.

Hotmelt adhesives are thermoplastic adhesive compositions, which are solid at room temperature. Prior to application of these adhesives, they are heated to become viscous fluids which solidify rapidly on cooling after the assembly of the substrates to be bonded. Hotmelt adhesives have acquired increasing significance in numerous areas of bonding technology. The advantages of hotmelts lay in the fact that they develop the necessary bond strength by cooling from the melt and, accordingly, are suitable for high-speed production processes. Since these adhesives do not contain volatile solvents, there is no need for exhaust equipment and no long drying times are required as for water-based adhesives.

Polyamides are an important class of hotmelt adhesives. Among polyamides, those based on dimeric fatty acids are particularly important because these polyamides on the one hand have a relatively narrow softening range and, on the other hand, show no tendency towards crystallization and resulting embrittlement, even at temperatures below 0° C.

Although adhesives based on polyamides derived from dimeric fatty acids show excellent properties in numerous applications, efforts are still being made to develop special hotmelt adhesives having even better adhesion properties. Thus, attempts have been made to modify the polyamides to adapt them to application involving bonding of nonpolar substrates such as poly-α-olefin substrates, in particular the frequently used polyethylene, polypropylene and corresponding copolymer substrates.

According to Gerd Habenicht "Kleben, Grundlagen, Technologie, Anwendungen", $3^{rd}$ edition, 1997 it is still necessary to surface treat polyethylene or polypropylene substrates before bonding by mechanical pretreatments like sanding or sanding and coating (SACO-process), flaming, corona-treatment, low pressure plasma, fluorinating, chemical etching or preapplying of primers.

U.S. Pat. No. 4,791,164 discloses hotmelt adhesives compositions which may be used for bonding nonpolar polymers like polyethylene or polypropylene with considerable strength without the otherwise usual pretreatments as mentioned above. These hotmelt adhesives comprise blends of polyamides consisting essentially of the reaction product of dimerized fatty acid, aliphatiac dicarboxylic acid, monomeric fatty acid and aliphatic diamines plus terpolymer based on ethylene. This terpolymer is based on ethylene and/or propylene, an ethylenically unsaturated anhydride of carboxylic acid and a $C_1$–$C_{18}$ alkyester of acrylic or methacrylic acid.

U.S. Pat. No. 4,912,196 suggests hotmelt adhesives compositions for difficult-to-bond plastic materials such as polyvinyl chloride, polyesters, polyethylene and metals. According to U.S. Pat. No. 4,912,196 blends of thermoplastic polyamide resins consisting of polycondensates of a dimer fatty acid or mixture of such acids, a polyoxyalkylene urea diamine, aliphatic $C_6$–$C_{40}$ diamine or a mixture of such diamines result in suitable hotmelt adhesive compositions for such substrates. Polyoxyakylene urea diamines are difficult to obtain in the market. Moreover, although these compositions give good adhesion to polyethylene in shear, their peel adhesion is poor.

U.S. Pat. No. 5,548,027 discloses hotmelt compositions for bonding non-pretreated polyethylene. In this reference compatible mixtures of at least one polyamide based on dimerized fatty acid, at least one copolymer of ethylene with at least one member selected from the group consisting of vinylacetate, acrylate and copolymers, block copolymers of styrene with ethylene isoprene butadiene and butylene and at least one plasticizer are suggested to solve this problem. The polyamide based on dimerized fatty acid may contain only very small amounts of trimeric fatty acid. This implies that only distilled dimer acid can be used. Although these adhesive compositions display very good adhesive properties both in tensile strength as well as in peel strength, they are expensive due to the fact that specific copolymers and purified dimer acids are required for making these adhesives.

According to EP-A-0 045 383, it is essential to use dimerized fatty acid with a very high content, preferably more than 90% by weight of dimer fatty acid and only a very small amount of trimeric fatty acid. According to EP-A-0 045 383 no more than 6% by weight of trimeric fatty acid should be present in the mixture.

"Dimerized fatty acids" are obtained by oligomerizing or polymerizing unsaturated long-chain monobasic fatty acids such as for example linoleic acid.or oleic acid. These polymeric acids have long been known and are commercially available. They are known to be a mixture of several isomers and oligomers. Prior to purification, such crude mixtures of polymeric fatty acids have approximately the following composition:

| monomeric acids | 5–15 % by weight |
| dimeric acids | 60–80 % by weight |
| trimeric acids | 10–35 % by weight |

These crude polymeric fatty acids are normally purified by distillation and sometimes subsequent hydrogenation. However, these purification steps add to the costs of the final product. It is highly desirable to find demanding uses for crude polymeric fatty acids.

BRIEF DESCRIPTION OF THE INVENTION

It has now surprisingly been found that polyamide adhesive compositions based on crude polymeric fatty acids are useful for making adhesive compositions for bonding nonpolar substrates like poly-α-olefins without prior pretreatment of the surface. Thus hotmelt adhesives with good adhesion to non-treated polyethylene are obtained from polyamides based on crude polymeric fatty acids with a trimer fatty acid content of up to 20% by weight and a proper balance of several organic diamines which avoids the presence of short polar segments in the polymer chain.

It has now surprisingly been found that polyamide adhesive compositions based on crude polymeric fatty acids are useful for making adhesive compositions for bonding unpolar substrates like poly-α-olefins without prior pretreatment of the surface. Thus hotmelt adhesives with good adhesion to non-treated polyethylene are obtained from polyamides based on crude polymeric fatty acids with a trimer fatty acid content of up to 20% by weight and a proper balance of several organic diamines which avoids the presence of short polar segments in the polymer chain.

More specifically, the compositions of the present invention comprise the condensation product of a) an acid component consisting essentially of one or more crude polymeric fatty acids and one or more dicarboxylic acids and optionally a monocarboxylic fatty acid
b) an amine component, consisting of
   i) one or more aliphatic diamines in which the amine groups are bonded to the aliphatic chain with a number of carbon atoms equal to or higher than 4 and,
   ii) one or more cyclic aliphatic diamines and optionally
   iii) one or more polyoxyalkylene diamine.

These polyamide condensation products are solid at room temperature, having a softening point of at least 80°, preferably above 100° C. These solid polyamides are either acid terminated or amine terminated.

DETAILED DESCRIPTION OF THE INVENTION

The softening point is determined by the standard Ring and Ball method according to ASTM E 28.

The reactants employed to prepare the polyamide adhesive compositions of the present invention are well known as are the methods of their preparation. The crude polymeric fatty acids are complex mixtures resulting from the polymerization of fatty acids. Representative of crude polymeric fatty acids are those commercially available from the polymerization of tall oil fatty acids, linoleic or oleic acid. These polymeric fatty acids have the following typical composition: $C_{18}$ monobasic acids (monomer) about 0 to 15% by weight, $C_{36}$ dibasic acids (dimer) 60 to 80% by weight, $C_{54}$ and higher polybasic acids (trimer) about 1 to 35% by weight, preferably up to 20% by weight. The relative ratios of monomer, dimer and trimer in the polymeric fatty acids depend on the nature of the starting material, the conditions of polymerization and the degree of purification. The polymeric fatty acids may be unhydrogenated or hydrogenated, however, for the purpose of the present invention, the polymeric fatty acids do not need any purification by distillation or hydrogenation.

In addition to the polymeric fatty acids, the acid component may contain $C_4$ to $C_{12}$ dicarboxylic acids and monocarboxylic acids with up to 20 carbon atoms. Examples of suitable dicarboxylic acids are maleic acid, succinic acid, adipic acid, azelaic acid, sebacic acid, dodecane-dioic acid, glutaric acid, suberic acid, pimelic acid or aromatic dicarboxylic acids, e.g. terephthalic acid or mixtures of these dicarboxylic acids. The carboxylic acid component of the polyamide may contain about 20 to 100 mol % of polymeric fatty acid and about 0 to 80 mol % of at least one $C_4$–$C_{12}$ dicarboxylic acid, preferably this mixture contains about 30 to 95 mol % of the polymeric fatty acid and about 5 to 70 mol % of the $C_4$–$C_{12}$ dicarboxylic acids. The monofunctional acid may be present in amounts of up to 20 mol %.

The diamine component consists essentially of (i) one or more aliphatic diamines with a number of carbon atoms in the chain of at least 4 whereby the amino groups are at the terminal ends of the carbon chain. The aliphatic diamines may contain up to 20 carbon atoms and the aliphatic chain may be essentially linear or branched. The most preferred aliphatic diamines are 1,4-butane diamine, 1,6-hexamethylene diamine, 1,8-diamino octane or 1,12-diamino dodecane.

(ii) In addition the diamine component must contain one or more organic diamines selected from the group of cyclic diamines and heterocyclic diamines. Examples for cyclic (aliphatic) diamines or heterocyclic diamines are cyclohexanediamine, 4,4'-diamino-dicyclohexyl-methane, xylenediamine, piperazine, cyclohexanebis (methylamine), isophorone diamine, dimethylpiperazine and dipiperidylpropane, dimer diamines (amines derived from dimer acids e. g. sold by Henkel under the trade name "Versamine").

(iii) In addition to the latter cyclic amines (ii) it is possible to use one or more polyoxyalkylene-diamines, for example polyoxyethylene diamine, polyoxypropylene-diamine or bis-(di-aminopropyl)-polytetrahydrofurane. The polyoxyalkylenediamines, also known as "Jeffamines" (tradename of Huntsman), are most preferred. Typically, their molecular weight ranges between 200 and 4.000 preferably between 400 and 2.000.

The amine component comprises preferably 20 to 85 mol % of the aliphatic diamines and 15 to 80 mol % of the cyclic diamine and 0 to 60 mol % of the polyoxyalkylene diamine, whereby at least one cyclic diamine is present in the amine component mixture.

The polyamide resins according to the invention may be prepared by conventional condensation methods and the acid components and amine components are present in approximate stoichiometric quantities. In the majority of cases it is preferred that residual acid groups or residual amino groups be present after the condensation. To achieve this, an excess of acid or base of no more than 10 equivalent % of the sum of all functional groups is used. Instead of the free carboxylic acids, their corresponding methyl-, ethyl or propyl-ester may be used in the condensation reaction. The melt viscosity of the polyamide-composition may be controlled by adding a small amount of a monofunctional carboxylic acid like stearic acid.

The polyamide compositions according to the present invention usually have a softening point (determined in accordance with ASTM-E-28) of 60 to 150° C. and preferably of 80 to 140° C.

The key advantage of the hotmelt adhesives of the present invention is their good adhesion to non-polar substrates as for example polyethylene. The present compositions not only give good shear adhesion but also very good peel adhesion without resorting to expensively purified (distilled) dimer fatty acids and/or blending in of other polymers into the hotmelt composition.

The polyamides of the present invention can be prepared by methods known in the art, for example by the general method disclosed in U.S. Pat. No. 4,912,196 examples 1–3.

The polyamide hotmelt adhesives are applied using conventional hotmelt application procedures such as spraying, print dipping, molding, spreading, rolling and the like. While for most constructions the resin is applied to only one side of the substrate, it may be applied to both sides in order to form a sandwich-type construction. Preferably, the polyamides of the present invention are the sole polymeric ingredient of the hotmelt adhesive, however, they may also be blended with other polyamides and/or other polymers. They may also contain other conventional additives like tackifiers, antioxidants, fillers and other common auxiliaries for hot melt adhesives.

The improved bonding properties of the polyamides of the present invention to untreated non-polar substrates can be further illustrated by the following examples. It is to be understood that the examples are only to be considered as an illustration of one embodiment of the invention and that modifications throughout may occur to those skilled in the art.

EXAMPLES (Table 1)

Examples 1 to 5

The polyamide-hotmelt adhesives were made by using a crude undistilled polymeric fatty acid, containing about 18% by weight of trimer acid. The condensation reaction was carried out following the general procedure disclosed in U.S. Pat. No. 4,912,196 examples 1 to 3. The composition of the

Comparative Examples 1 to 6

Comparative examples 1 to 3 (containing ethylene diamine in the amine component) exhibit a fairly high tensile strength, but their peel strength is very low.

Comparative examples 4 and 5 use the polyamides A and B of table 4 in U.S. Pat. No. 4,791,164. Although distilled polymeric fatty acid containing only 4% trimer is used in these examples, the peel adhesion to polyethylene is poor.

Comparative example 6 is equivalent to example 1 disclosed in U.S. Pat. No. 5,548,027. While the peel adhesion values of this hotmelt adhesive composition is very good and similar to those of the present invention, the disadvantage of these compositions is the requirement of distilled dimer fatty acids. In addition, a number of special copolymers for blending are required to achieve the final results of this adhesive composition.

TABLE 1

| example | 1 | 2 | 3 | 4 | 5 | comp.1 | comp.2 | comp.3 | comp.4 | comp.5 | comp.6 |
|---|---|---|---|---|---|---|---|---|---|---|---|
| crude polymeric fatty acid | 0.880 | 0.880 | 0.880 | 0.885 | 0.945 | 0.880 | 0.885 | 0.945 | | | |
| Distilled polymeric fatty acid | | | | | | | | | 0.930 | 1.000 | |
| Monomer (stearic acid) | 0.060 | 0.060 | 0.069 | 0.055 | 0.055 | 0.060 | 0.055 | 0.055 | 0.070 | | |
| Adipic acid | 0.060 | 0.060 | 0.060 | 0.060 | | 0.060 | 0.060 | | | | |
| total acid equivalent | 1.000 | 1.000 | 1.000 | 1.000 | 1.000 | 1.000 | 1.000 | 1.000 | 1.000 | 1.000 | |
| Ethylendiamine | | | | | | 0.615 | 0.615 | 0.800 | 0.923 | 0.920 | |
| 1,4-diaminobutane | 0.615 | | | | | | | | | | |
| 1,6-diaminohexane | | 0.615 | | 0.615 | 0.800 | | | | | | |
| 1,12-diaminododecane | | | 0.615 | | | | | | | | |
| Piperazine | 0.435 | 0.435 | 0.435 | 0.415 | | 0.435 | 0.415 | | | | |
| Versamine | | | | | 0.250 | | | 0.250 | | | |
| Jeffamine, D2000 | | | | 0.020 | | | 0.020 | | | 0.120 | |
| Bis-(3-aminopropyl)poly tetrahydrofuran (MW1100) | | | | | | | | | 0.075 | | |
| total amine equivalent | 1.050 | 1.050 | 1.050 | 1.050 | 1.050 | 1.050 | 1.050 | 1.050 | 0.923 | 1.040 | |
| Peel PE/PE, N/cm | 72 | 80 | 75 | 55 | 70 | 20 | 20 | 40 | 10 | 20 | 100 |
| Softening Point, ° C. | 101 | 98 | 93 | 96 | 92 | 110 | 105 | 99 | 105 | 105 | 100 |
| Viscosity at 160° C., mPa s | 17500 | 35500 | 60000 | 40500 | 46000 | 29500 | 24800 | 14250 | 1000 | 30000 | 30000 |
| Tensile yield, N/mm2 | 3.7 | 3.6 | 5.6 | 3.9 | 2.7 | 5.5 | 4 | 3.6 | 7 | 6 | 3.5 |
| Elongation, % | 580 | 670 | 580 | 580 | 590 | 650 | 600 | 620 | 200 | 1000 | 1000 |
| Tensile Modulus, N/mm2 | 55 | 46 | 65 | 55 | 35 | 70 | 60 | 65 | 180 | 150 | 70 | acid components and amine components are given in equivalents. The adhesion property to polyethylene was determined according to DIN 53539.

The softening point was measured according to ASTM E28, the viscosity was measured at 160° C. according to ASTM D3236 and the tensile properties like tensile yield (tensile strength), elongation at break and tensile modulus were determined according to ASTM D638.

We claim:

1. A hotmelt adhesive composition based on polyamides for bonding untreated
   poly-α-olefin substrates wherein the polymeric binder component consists essentially of a condensation product of
   a carboxylic acid component consisting essentially of;
     polymerized fatty acids containing more than 6% by weight of trimeric acid
     optionally aliphatic and/or aromatic dicarboxylic acids optionally a monocarboxylic acid
an amine component consisting essentially of;
one or more aliphatic diamines with a number of carbon atoms equal to or greater than 4 whereby the amino groups are at the terminal ends of the carbon chain;
one or more cycloaliphatic or heterocyclic diamines; and optionally, one or more polyoxyalkylenediamines.

2. The hotmelt adhesive composition of claim 1 wherein the polymerized fatty acid (component a) (i)) contains up to 35 by weight of trimeric acid.

3. The hotmelt adhesive composition of clam 1 wherein the polymerized fatty acid contains
(i) 0–15% by weight of monomeric fatty acids
(ii) 60–80% by weight of dimeric fatty acids
(iii) 6–35% by weight trimeric fatty acids the sum of (i)–(iii) being 100%.

4. The polyamide hotmelt adhesive of claim 1 wherein said carboxylic acid component (a) comprises:
30 to 100 mole % of polymeric fatty acid; and
0 to 70 mole % of at least one dicarboxylic acid selected from the group consisting of aliphatic dicarboxylic acid and aromatic dicarboxylic acids.

5. The polyamide hotmelt adhesive of claim 1 wherein said amine component (b) comprises:
20 to 85 mole % of aliphatic diamines (i);
15 to 80 Mole % of cycloaliphatic diamines (ii); and
0 to 50 mole % of polyoxyalkylene diamines (iii).

6. The polyamide hotmelt adhesive of claim 1 wherein the dicarboxylic acid is selected from the group consisting of azelaic acid, sebacic acid, dodecane-dioic acid, adipic acid, glutaric acid, maleic acid, succinic acid, suberic acid, pimelic acid, terephathalic acid and mixtures thereof.

7. A process of bonding poly-α-olefin substrates comprising steps of
melt applying the hotmelt adhesive composition of claim 1 to at least one substrate—to be bonded by spraying, print dipping, molding, spreading or rolling;
joining the substrates to be bonded;
optionally applying pressure;
allowing the bond line to cool to ambient temperature.

8. The process of claim 7 where the poly-α-olefin substrate is selected from the group consisting of polyethylene and copolymers of ethylene with other comonomers.

9. The hotmelt adhesive of claim 2 wherein the polymerized fatty acid contains
(i) 0–15% by weight monomeric fatty acids
(ii) 60–80% by weight dimeric fatty acids
(iii) 6–35% by weight trimeric fatty acids the sum of (i)–(iii) being 100%.

10. The hotmelt adhesive of claim 2 wherein said carboxylic acid component (a) comprises:
30 to 100 mole % of polymeric fatty acid and
0 to 70 mole % of at least one dicarboxylic acid selected from the group consisting of aliphatic, dicarboxylic acid and aromatic dicarboxylic acids.

11. The hotmelt of adhesive of claim 3 wherein said carboxylic acid component (a) comprises:
30 to 100 mole % of polymeric fatty acid and
0 to 70 mole % of at least one dicarboxylic acid selected from the group consisting of aliphatic, dicarboxylic acid and aromatic dicarboxylic acids.

12. The hotmelt adhesive of claim 2 wherein said amine component (b) comprises:
20 to 85 mole % of aliphatic diamines (i);
15 to 80 Mole % of cycloaliphatic diamines (ii); and
0 to 50 mole % of polyoxyalkylene diamines (iii).

13. The hotmelt adhesive of claim 3 wherein said amine component (b) comprises:
20 to 85 mole % of aliphatic diamines (i);
15 to 80 Mole % of cycloaliphatic diamines (ii); and
0 to 50 mole % of polyoxyalkylene diamines (iii).

14. The hotmelt adhesive of claim 4 wherein said amine component (b) comprises:
20 to 85 mole % of aliphatic diamines (i);
15 to 80 Mole % of cycloaliphatic diamines (ii); and
0 to 50 mole % of polyoxyalkylene diamines (iii).

15. The hotmelt adhesive of claim 2 wherein the dicarboxylic acid is selected from the group consisting of azelaic acid, sebacic acid, dodecane-dioic acid or adipic acid, glutaric acid, maleic acid, succinic acid, suberic acid, pimelic acid, terephathalic acid and mixtures thereof.

16. The hotmelt adhesive of claim 3 wherein the dicarboxylic acid is selected from the group consisting of azelaic acid, sebacic acid, dodecane-dioic acid or adipic acid, glutaric acid, maleic acid, succinic acid, suberic acid, pimelic acid, terephathalic acid and mixtures thereof.

17. The hotmelt adhesive of claim 4 wherein the dicarboxylic acid is selected from the group consisting of azelaic acid, sebacic acid, dodecane-dioic acid or adipic acid, glutaric acid, maleic acid, succinic acid, suberic acid, pimelic acid, terephathalic acid and mixtures thereof.

18. The hotmelt adhesive of claim 5 wherein the dicarboxylic acid is selected from the group consisting of azelaic acid, sebacic acid, dodecane-dioic acid or adipic acid, glutaric acid, maleic acid, succinic acid, suberic acid, pimelic acid, terephathalic acid and mixtures thereof.

19. The process of bonding poly-α-olefin substrates comprising steps of
melt applying the hotmelt adhesive composition of claim 2 to at least one substrate to be bonded by spraying, print dipping, molding, spreading or rolling;
joining the substrates to be bonded;
optionally applying pressure;
allowing the bond line to cool to ambient temperature.

20. The process of bonding poly-α-olefin substrates comprising steps of
melt applying the hotmelt adhesive composition of claim 3 to at least one substrate to be bonded by spraying, print dipping, molding, spreading or rolling;
joining the substrates to be bonded;
optionally applying pressure;
allowing the bond line to cool to ambient temperature.

21. The process of bonding poly-α-olefin substrates comprising steps of
melt applying the hotmelt adhesive composition of claim 4 to at least one substrate to be bonded by spraying, print dipping, molding, spreading or rolling;
joining the substrates to be bonded;
optionally applying pressure;
allowing the bond line to cool to ambient temperature.

22. The process of bonding poly-α-olefin substrates comprising steps of
melt applying the hotmelt adhesive composition of claim 5 to at least one substrate to be bonded by spraying, print dipping, molding, spreading or rolling;
joining the substrates to be bonded;
optionally applying pressure;

allowing the bond line to cool to ambient temperature.

23. The process of bonding poly-α-olefin substrates comprising steps of melt applying the hotmelt adhesive composition of claim 6 to at least one substrate to be bonded by spraying, print dipping, molding, spreading or rolling;

joining the substrates to be bonded;

optionally applying pressure;

allowing the bond line to cool to ambient temperature.

* * * * *

UNITED STATES PATENT AND TRADEMARK OFFICE
CERTIFICATE OF CORRECTION

PATENT NO. : 6,670,442 B1
DATED : December 30, 2003
INVENTOR(S) : Rossini et al.

It is certified that error appears in the above-identified patent and that said Letters Patent is hereby corrected as shown below:

<u>Column 7,</u>
Line 13, delete "clam" and insert therefore -- claim --.

Signed and Sealed this

Twenty-first Day of December, 2004

JON W. DUDAS
*Director of the United States Patent and Trademark Office*